(12) United States Patent
Daniell et al.

(10) Patent No.: US 7,930,351 B2
(45) Date of Patent: Apr. 19, 2011

(54) IDENTIFYING UNDESIRED EMAIL MESSAGES HAVING ATTACHMENTS

(75) Inventors: W. Todd Daniell, Marietta, GA (US); Dale W. Malik, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1216 days.

(21) Appl. No.: 10/685,656

(22) Filed: Oct. 14, 2003

(65) Prior Publication Data

US 2005/0091321 A1  Apr. 28, 2005

(51) Int. Cl.
G06F 15/16 (2006.01)
(52) U.S. Cl. ..................... 709/206
(58) Field of Classification Search .............. 709/206
See application file for complete search history.

(56) References Cited

U.S. PATENT DOCUMENTS

| | | | |
|---|---|---|---|
| 5,944,787 A | 8/1999 | Zoken | |
| 5,999,932 A | 12/1999 | Paul | |
| 6,023,723 A | 2/2000 | McCormick | |
| 6,052,709 A | 4/2000 | Paul | |
| 6,161,130 A | 12/2000 | Horvitz et al. | |
| 6,192,360 B1 | 2/2001 | Dumais et al. | 707/6 |
| 6,249,805 B1 | 6/2001 | Fleming, III | |
| 6,266,692 B1 | 7/2001 | Greenstein | |
| 6,321,267 B1 | 11/2001 | Donaldson | |
| 6,442,588 B1 | 8/2002 | Clark et al. | |
| 6,480,885 B1 | 11/2002 | Olivier | |
| 6,625,657 B1 | 9/2003 | Bullard | |
| 6,654,787 B1 | 11/2003 | Aronson et al. | |
| 6,654,800 B1 | 11/2003 | Rieger, III | |
| 6,665,715 B1 | 12/2003 | Houri | |
| 6,708,205 B2 | 3/2004 | Sheldon et al. | |
| 6,732,157 B1 * | 5/2004 | Gordon et al. | 709/206 |
| 6,748,403 B1 | 6/2004 | Lemke | |
| 6,757,740 B1 | 6/2004 | Parekh et al. | |
| 6,763,462 B1 | 7/2004 | Marsh | |
| 6,769,016 B2 | 7/2004 | Rothwell | |
| 6,779,021 B1 | 8/2004 | Bates | |
| 6,782,510 B1 | 8/2004 | Gross et al. | |
| 6,842,773 B1 | 1/2005 | Ralston et al. | |
| 6,854,014 B1 | 2/2005 | Amin et al. | |
| 6,941,466 B2 | 9/2005 | Mastrianni | |
| 6,968,571 B2 * | 11/2005 | Devine et al. | 726/11 |
| 7,051,077 B2 | 5/2006 | Lin | |
| 7,117,358 B2 | 10/2006 | Bandini et al. | |
| 7,155,484 B2 | 12/2006 | Malik | |

(Continued)

OTHER PUBLICATIONS

M. Sahami et al. A Bayesian Approach for Filtering Junk E-mail. Learning for Text Categorization: Papers from the 1998 Workshop.*

(Continued)

*Primary Examiner* — Yasin Barqadle
*Assistant Examiner* — John M Macilwinen
(74) *Attorney, Agent, or Firm* — Thomas, Kayden, Horstemeyer & Risley, LLP

(57) ABSTRACT

Several embodiments, among others, provided in the present disclosure provide for tokenizing portions of an email message, which previously were not tokenized. The tokenizing of these portions generates tokens that are representative of these portions. The generated tokens are used to determine whether or not the email message is spam. In some embodiments, the tokenized portions may include attachments in email messages. In other embodiments, the tokenized portions may include a simple mail transfer protocol (SMTP) email address and a domain name corresponding to the SMTP email address.

27 Claims, 9 Drawing Sheets

U.S. PATENT DOCUMENTS

| | | | |
|---|---|---|---|
| 7,155,608 B1 | 12/2006 | Malik | |
| 7,320,020 B2* | 1/2008 | Chadwick et al. | 709/206 |
| 7,451,184 B2 | 11/2008 | Malik | |
| 7,506,031 B2 | 3/2009 | Malik | |
| 7,610,341 B2 | 10/2009 | Daniell | |
| 7,664,812 B2 | 2/2010 | Daniell | |
| 7,844,678 B2 | 11/2010 | Malik | |
| 2001/0054101 A1 | 12/2001 | Wilson | |
| 2002/0013692 A1 | 1/2002 | Chandhok | |
| 2002/0049806 A1 | 4/2002 | Gatz et al. | |
| 2002/0059454 A1 | 5/2002 | Barrett et al. | |
| 2002/0065828 A1 | 5/2002 | Goodspeed | |
| 2002/0073233 A1 | 6/2002 | Gross et al. | |
| 2002/0107712 A1 | 8/2002 | Lam et al. | |
| 2002/0116641 A1 | 8/2002 | Mastrianni | |
| 2002/0199095 A1 | 12/2002 | Bandini et al. | |
| 2003/0097409 A1 | 5/2003 | Tsai | |
| 2003/0097410 A1 | 5/2003 | Atkins et al. | |
| 2003/0144842 A1 | 7/2003 | Addison et al. | |
| 2003/0172196 A1 | 9/2003 | Hejlsberg et al. | |
| 2003/0233418 A1 | 12/2003 | Goldman | |
| 2004/0015554 A1 | 1/2004 | Wilson | |
| 2004/0039786 A1 | 2/2004 | Horvitz et al. | |
| 2004/0054733 A1 | 3/2004 | Weeks | |
| 2004/0054741 A1 | 3/2004 | Weatherby et al. | |
| 2004/0064537 A1* | 4/2004 | Anderson et al. | 709/223 |
| 2004/0073617 A1* | 4/2004 | Milliken et al. | 709/206 |
| 2004/0088359 A1 | 5/2004 | Simpson | |
| 2004/0093384 A1* | 5/2004 | Shipp | 709/206 |
| 2004/0107189 A1* | 6/2004 | Burdick et al. | 707/3 |
| 2004/0117451 A1 | 6/2004 | Chung | |
| 2004/0123153 A1 | 6/2004 | Wright et al. | |
| 2004/0167964 A1 | 8/2004 | Rounthwaite et al. | |
| 2004/0181581 A1 | 9/2004 | Kosco | |
| 2004/0193606 A1 | 9/2004 | Arai et al. | |
| 2005/0022008 A1 | 1/2005 | Goodman et al. | |
| 2005/0050150 A1 | 3/2005 | Dinkin | |
| 2005/0060535 A1 | 3/2005 | Bartas | |
| 2006/0047769 A1 | 3/2006 | Davis et al. | |
| 2008/0256210 A1 | 10/2008 | Malik | |

OTHER PUBLICATIONS

UUencode and MIME FAQ. http://web.archive.org/web/20021217052047/http://users.rcn.com/wussery/attach.html. pp. 1 and 2.*

M. Woitaszek and M. Shaaban. Identifying Junk Electronic Mail in Microsoft Outlook with a Support Vector Machine. Proccedings of the 2003 Symposium on Applications of the Internet, held Jan. 27-31, 2003.*

Files, J. and Huskey, H. An information retrieval system based on superimposed coding. AFIPS Joint Computer Conferences. Proceedings of the Nov. 18-20, 1969, fall joint computer conference. pp. 423-431.*

Malik; Non-Final Rejection mailed May 16, 2005; U.S. Appl. No. 10/005,641, filed Dec. 5, 2001.

Malik; Final Rejection mailed Nov 15, 2005; U.S. Appl. No. 10/005,641, filed Dec. 5, 2001.

Malik; Non-Final Rejection mailed May 5, 2006; U.S. Appl. No. 10/005,641, filed Dec. 5, 2001.

Malik; Notice of Allowance and Fee Dues mailed Oct. 17, 2006; U.S. Appl. No. 10/005,641, filed Dec. 5, 2001.

Daniell; Non-Final Rejection mailed Jan. 25, 2008; U.S. Appl. No. 10/686,293, filed Oct. 14, 2003.

Spamxpress; "spamxpress—anti-spam Rules/Filters for Outlook Express", Jun. 2, 2003, Web page retreived from The Internet Archive Wayback Machine, available at: http://web.archive.org/web/20030602073212/http://www.spamxpress.com/; 3 pages.

Williams; "Effective Spam Filtering with Eudora—The Filters", Aug. 6, 2003, Web page retreived from The Internet Archive Wayback Machine, available at: http://web.archive.org/web/20030806181316/http://www.cecilw.com/eudora/filters.htm; 3 pages.

Daniell; Final Rejection mailed May 22, 2008 for U.S. Appl. No. 10/686,293, filed Oct. 14, 2003.

Daniell; Non-Final Rejection mailed Jul. 18, 2008 for U.S. Appl. No. 10/686,346, filed Oct. 14, 2003.

Daniell; Final Rejection mailed Jul. 21, 2008 for U.S. Appl. No. 10/686,558, filed Oct. 14, 2003.

Malik; Notice of Allowance and Fees Due mailed Sept. 5, 2008 for U.S. Appl. No. 10/687,439, filed Oct. 14, 2003.

Malik; Notice of Allowance and Fees Due mailed Nov. 4, 2008 for U.S. Appl. No. 11/466,948, filed Aug. 24, 2006.

Daniell; Non-Final Rejection mailed Oct. 15, 2008 for U.S. Appl. No. 10/686,293, filed Oct 14, 2003.

Daniell; Final Office Action mailed Apr. 17, 2009 for U.S. Appl. No. 10/686,293, filed Oct. 14, 2003.

Daniell, Final Rejection mailed Jan. 21, 2009 for U.S. Appl. No. 10/686,346, filed Oct. 14, 2003.

Daniell; Notice of Allowance mailed Feb. 9, 2009 for U.S. Appl. No. 10/685,558, filed Oct. 14, 2003.

Malik; Non-Final Rejection mailed Mar. 31, 2009 for U.S. Appl. No. 11/609,164, filed Dec. 11, 2006.

Sheppard, Non-Final Rejection mailed Feb. 4, 2009 for U.S. Appl. No. 11/245,888, filed Oct. 7, 2005.

Sheppard; Interview Summary mailed May 5, 2009 for U.S. Appl. No. 11/245,888, filed Oct. 7, 2005.

Malik; Interview Summary mailed Jun. 9, 2009 for U.S. Appl. No. 11/609,164, filed Dec. 11, 2006.

Daniell; Notice of Allowance mailed Jun. 30, 2009 for U.S. Appl. No. 10/686,346, filed Oct. 14, 2009.

Daniell; Final Office Action mailed Aug. 12, 2009 for U.S. Appl. No. 10/686,293, filed Oct. 14, 2003.

Daniell; Supplemental Notice of Allowance mailed Aug. 25, 2009 for U.S. Appl. No. 10/686,346, filed Oct. 14, 2003.

Sheppard; Non-Final Rejection mailed Aug. 21, 2009 for U.S. Appl. No. 11/245,888, filed Oct. 7, 2005.

Daniell; Supplemental Notice of Allowability mailed Sep. 22, 2009 for U.S. Appl. No. 10/686,346, filed Oct. 14, 2003.

Daniell; Notice of Allowance mailed Oct. 5, 2009 for U.S. Appl. No. 10/685,558, filed Oct. 14, 2003.

Malik; Final Rejection mailed Oct. 13, 2009 for U.S. Appl. No. 11/609,164, filed Dec. 11, 2006.

Malik; Non-Final Office Action mailed Apr. 22, 2010 for U.S. Appl. No. 12/146,155, filed Jun. 25, 2008.

Daniell; Notice of Abandonment mailed Apr. 5, 2010 for U.S. Appl. No. 10/686,293, filed Oct. 14, 2003.

"How does eMail Server Work?", Oracle eMail Server Understanding and Planning Guide, Release 5.1, 13 pages, 2000.

" Understanding a Simple E-mail Server?", How E-mail works, Marshall Brian's How Stuff Works, 2 pages, 2001.

" Understanding a Simple E-mail Server?", How E-mail works, Marshall Brian's How Stuff Works, 2 pages, 2001.

"Understanding the POP3 Server?", How E-Mail Works, Marshall Brian's How Stuff Works, 2 pages, 2001.

"Understanding Attachments", How E-mail Works, Marshall Brian's How Stuff Works, 2 pages, 2001.

"E-mail Glossary", Everything E-mail, Internet Mail Services Network, Inc., Ipswich, MA, 3 pages, 1999.

"How Does Email Work?", Yale University Library Workstation Support Group, 4 pages, Mar. 18, 1997.

"How Does Email Work?", IATS Computing Knowledge Base, University of Missouri, Columbia, 4 pages, Aug. 16, 2000.

"What is an E-mail message", How E-mail works, Marshall Brian's How Stuff Works, 2 pages, 2001.

Malik; U.S. Appl. No. 11/466,948, filed Aug. 24, 2006.

Daniell; U.S. Appl. No. 10/685,558, filed Oct. 14, 2003.

Malik; U.S. Appl. No. 10/610,736, filed Jun. 30, 2003.

Daniell; U.S. Appl. No. 10/686,293, filed Oct. 14, 2003.

Malik; U.S. Appl. No. 11/609,164, filed Dec. 11, 2006.

Sheppard; U.S. Appl. No. 11/245,888, filed Oct. 7, 2005.

Daniell; U.S. Appl. No. 10/687,439, filed Oct. 14, 2003.

Malik; U.S. Appl. No. 10/005,641, filed Dec. 5, 2001.

Malik; Non-Final Rejection mailed Mar. 9, 2007; U.S. Appl. No. 11/466,948, filed Aug. 24, 2006.

Malik; Final Rejection mailed Sep. 26, 2007; U.S. Appl. No. 11/466,948, filed Aug. 24, 2006.

Malik; Non-Final Rejection mailed Nov. 12, 2004; U.S. Appl. No. 10/610,736, filed Jun. 30, 2003.
Malik;Examiner Interview Summary Record mailed Dec. 21, 2004; U.S. Appl. No. 10/610,736, filed Jun. 30, 2003.
Malik; Final Rejection mailed May 25, 2005; U.S. Appl. No. 10/610,736, filed Jun. 30, 2003.
Malik; Non-Final Rejection mailed Dec. 25, 2005; U.S. Appl. No. 10/610,736, filed Jun. 30, 2003.
Malik; Non-Final Rejection mailed Nov. 30, 2005; U.S. Appl. No. 10/610,736, filed Jun. 30, 2003.
Malik; Final Rejection mailed Apr. 11, 2006; U.S. Appl. No. 10/610,736, filed Jun. 30, 2003.
Malik; Examiner Interview Summary Record mailed Jun. 1, 2006; U.S. Appl. No. 10/610,736, filed Jun. 30, 2003.
Malik; Examiner Interview Summary Record mailed Jul. 6, 2006; U.S. Appl. No. 10/610,736, filed Jun. 30, 2003.
Malik; Notice of Allowance and Fees Due mailed Jul. 6, 2006; U.S. Appl. No. 10/610,736, filed Jun. 30, 2003.
Daniell; Non-Final Rejection mailed May 18, 2007; U.S. Appl. No. 10/687,439, filed Oct. 14, 2003.
Daniell; Final Rejection mailed Oct. 4, 2007; U.S. Appl. No. 10/687,439, filed Oct. 14, 2003.
Daniell; Non-Final Rejection mailed Feb. 5, 2007; U.S. Appl. No. 10/686,293, filed Oct. 14, 2003.
Daniell; Examiner Interview Summary Record mailed Mar. 30, 2007; U.S. Appl. No. 10/686,293, filed Oct. 14, 2003.
Daniell; Final Rejection mailed Jul. 23, 2007; U.S. Appl. No. 10/686,293, filed Oct. 14, 2003.
Daniell; Non-Final Rejection mailed Dec. 5, 2007; U.S. Appl. No. 10/686,293, filed Oct. 14, 2003.
Sheppard; Non-Final Office Action mailed Jul. 7, 2010 for U.S. Appl. No. 11/245,888, filed Oct. 7, 2005.
Malik; Notice of Allowance mailed Aug. 25, 2010 U.S. Appl. No. 12/146,155, filed Jun. 25, 2008.
Daniell; Non-Final Office Action mailed Sep. 14, 2010 for U.S. Appl. No. 12/627,259 mailed Nov. 30, 2009.
Mehran Sahami, et al.; Entitled: A Bayesian Approach to Filtering Junk E-Mail; pp. 1-8, 1998.
www.paulgraham.com/spam.html; Entitled: A Plan for Span; printed Jun. 26, 2003; pp. 1-13.
www.paulgraham.com/better.html; Entitled: Better Bayesian Filtering; printed Jun. 26, 2003; pp. 1-11.
R. Rivest; Entitled: The MD5 Message-Digest Algorithm; Apr. 1992; pp. 1-21.

* cited by examiner

IDENTIFYING UNDESIRED EMAIL MESSAGES HAVING ATTACHMENTS

FIELD OF THE INVENTION

The present disclosure relates generally to digital communication and, more particularly, to email.

BACKGROUND

With the advent of the Internet, email has become prevalent in digital communications. For example, email messages are exchanged on a daily basis to conduct business, to maintain personal contacts, to send and receive files, etc. Unfortunately, undesired email messages have also become prevalent with increased email traffic. Often, these email messages are unsolicited advertisements, which are often referred to as "junk mail" or "spam," sent by email mass-mailing programs or other entities, who are often referred to as "spammers."

Bayesian filters have emerged as a robust approach to reducing spam. Bayesian filters are described in publications such as, for example, "A Plan for Spam" by Paul Graham, published at http://www.paulgraham.com/spam.html, in August of 2002 (also referred to herein as "the Graham article"), which is incorporated herein by reference in its entirety. As known to those skilled in the art, as evidenced by the published articles, Bayesian filters operate by scanning incoming email messages into tokens. The most interesting tokens, where interesting is measured by how far their spam probability is from a neutral value, are used to calculate the probability that the email is spam.

As anti-spam filters adaptively refine their spam-identifying abilities, the spammers invent other ways of defeating these spam filters. For example, Bayesian filters typically scan the subject and body of an email in order to extract the tokens. While the tokens in the subject and body of the email message may be sufficient to identify a vast majority of spam, spammers may circumvent the filters using other techniques. Thus, an ongoing need for better spam identification exists in the industry.

SUMMARY

Several embodiments, among others, provided in the present disclosure provide for tokenizing portions of an email message, which previously were not tokenized. The tokenizing of these portions generates tokens that are representative of these portions. The generated tokens are used to determine whether or not the email message is spam. In some embodiments, the tokenized portions may include attachments in email messages. In other embodiments, the tokenized portions may include a simple mail transfer protocol (SMTP) email address and a domain name corresponding to the SMTP email address.

Other systems, methods, features, and advantages will be or become apparent to one with skill in the art upon examination of the following drawings and detailed description. It is intended that all such additional systems, methods, features, and advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Figure 1:
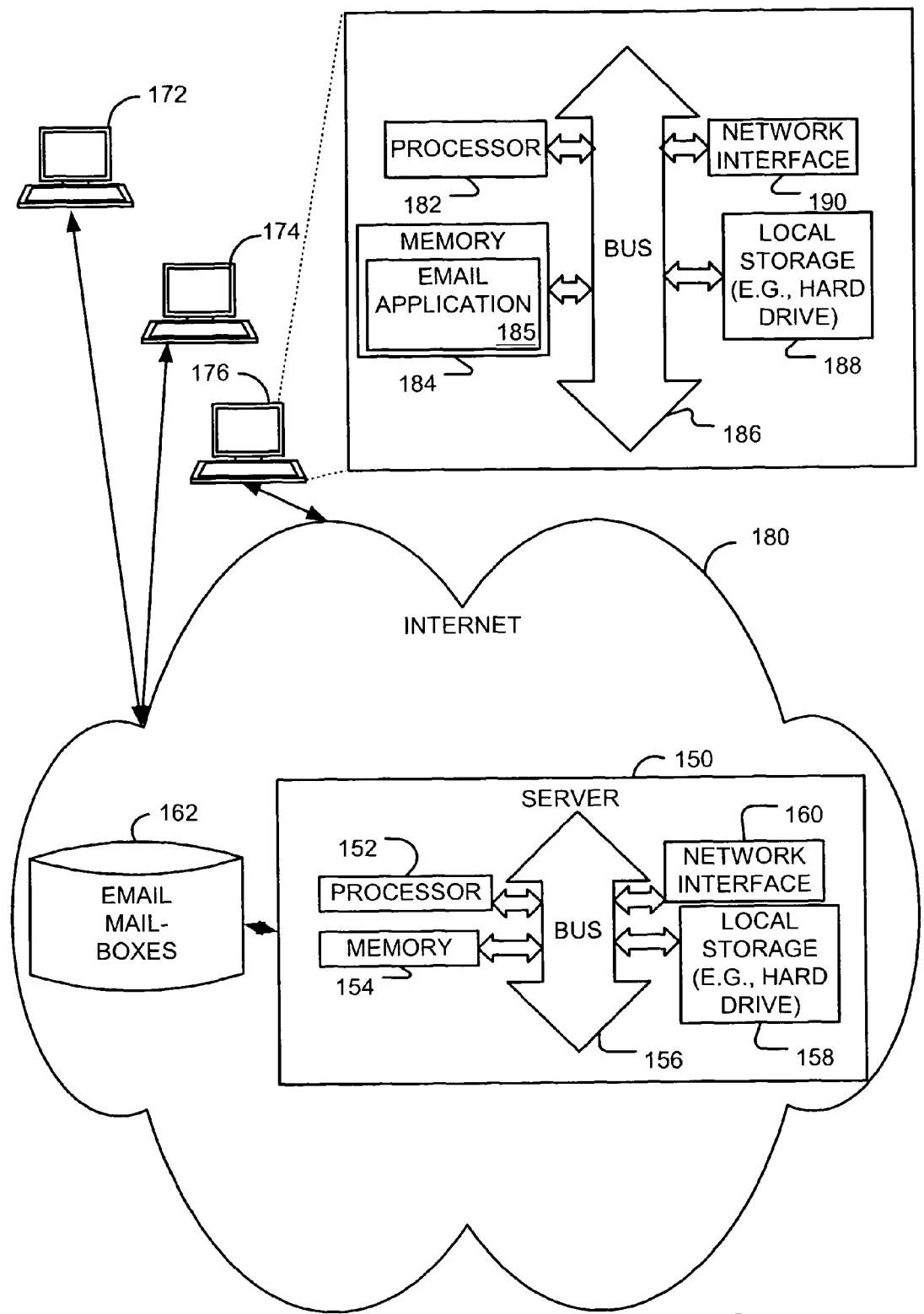
FIG. 1 is a block diagram showing an embodiment of a system where portions of email messages are tokenized.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

As is known in the art, as evidenced by Paul Graham's article "A Plan for Spam," published in August 2002 and available at http://www.paulgraham.com/spam.html (also referred to herein as "the Graham article"), which is incorporated herein by reference in its entirety, Bayesian filters provide an elegant approach to filtering undesired email messages (e.g., spam, junk mail, bulk mail, etc.). Since Bayes' Theorem is known to those of skill in the art, only a cursory explanation of Bayesian analysis is provided herein.

The Bayes' Theorem generally provides that, given a multitude of factors that affect a particular outcome, the probability of that particular outcome may be represented as a conditional probability of the aggregate of probabilities from each of the multitude of factors. Hence, when a Bayesian filter evaluates an email message to determine its likelihood of being spam, a Bayesian combination of spam probabilities is calculated for each of the individual words in the email message. Thereafter, the spam probabilities of each of the individual words are used to calculate a conditional probability of whether or not the entire email message is spam.

Hence, when an email message arrives, the email message is scanned into tokens, which may be generated from words in the subject or the body of the email message or a finite string of characters. The most interesting tokens, which may be words having the most non-neutral spam probabilities, are used to calculate a probability that the email message is spam. For example, the Bayesian filter may select the fifteen most interesting tokens, and perform a Bayesian analysis on those fifteen tokens. Often, the Bayesian analysis results in a probability value that is clearly indicative of spam or clearly indicative of non-spam, with very few email messages being indicated as neutral.

While the scanning of the subject and body of an email message may be sufficient to identify a vast majority of spam, other portions of the email message, which are typically not scanned by the Bayesian filter, may also contain indicia of spam. For example, in order to thwart anti-spam filters, enterprising spammers may send spam that is in the form of an image attachment or other type of attachment that is typically not scanned by the Bayesian filter. Additionally, other portions of the email message, such as, for example, the simple mail transfer protocol (SMTP) address, may also provide indicia of spam. The SMTP address may be indicative of a sender's email address, a reply-to address, or other recipients that are carbon-copied (cc'd) on the email message. The SMTP address may be further sub-divided into various fields, such as, for example, a user name and a domain name associated with the SMTP address. The sub-divided fields may also provide indicia of spam. The embodiments described below provide approaches in which the normally-unscanned portions of the email message may be scanned into tokens (or "tokenized") so that those normally-unscanned portions may also be used in identifying spam. While the specific embodiments below teach the identification of spam in the context of Bayesian filters, it should be appreciated that the normally-unscanned portion, once tokenized, may be used in other types of spam filters.

In addition to using attachments for spam purposes, enterprising spammers may also send spam by embedding comments or control characters (e.g., font control, color control, etc.) within a text message. The embedding of comments or control characters within a text message may reduce the text to seemingly random characters. However, while string search algorithms may view the text as random characters, the email message is, in actuality, rendered as a coherent text to the end user. The embodiments below also provide approaches in which the comments and control characters are effectively removed in order to tokenize the text as it would be rendered to the end user. In this regard, spam may be further characterized in the absence of normally-non-rendered or normally-non-displayed characters.

In yet other embodiments, a phonetic equivalent of words in the email message are generated in an effort to more rigorously filter spam.

Figure 2:
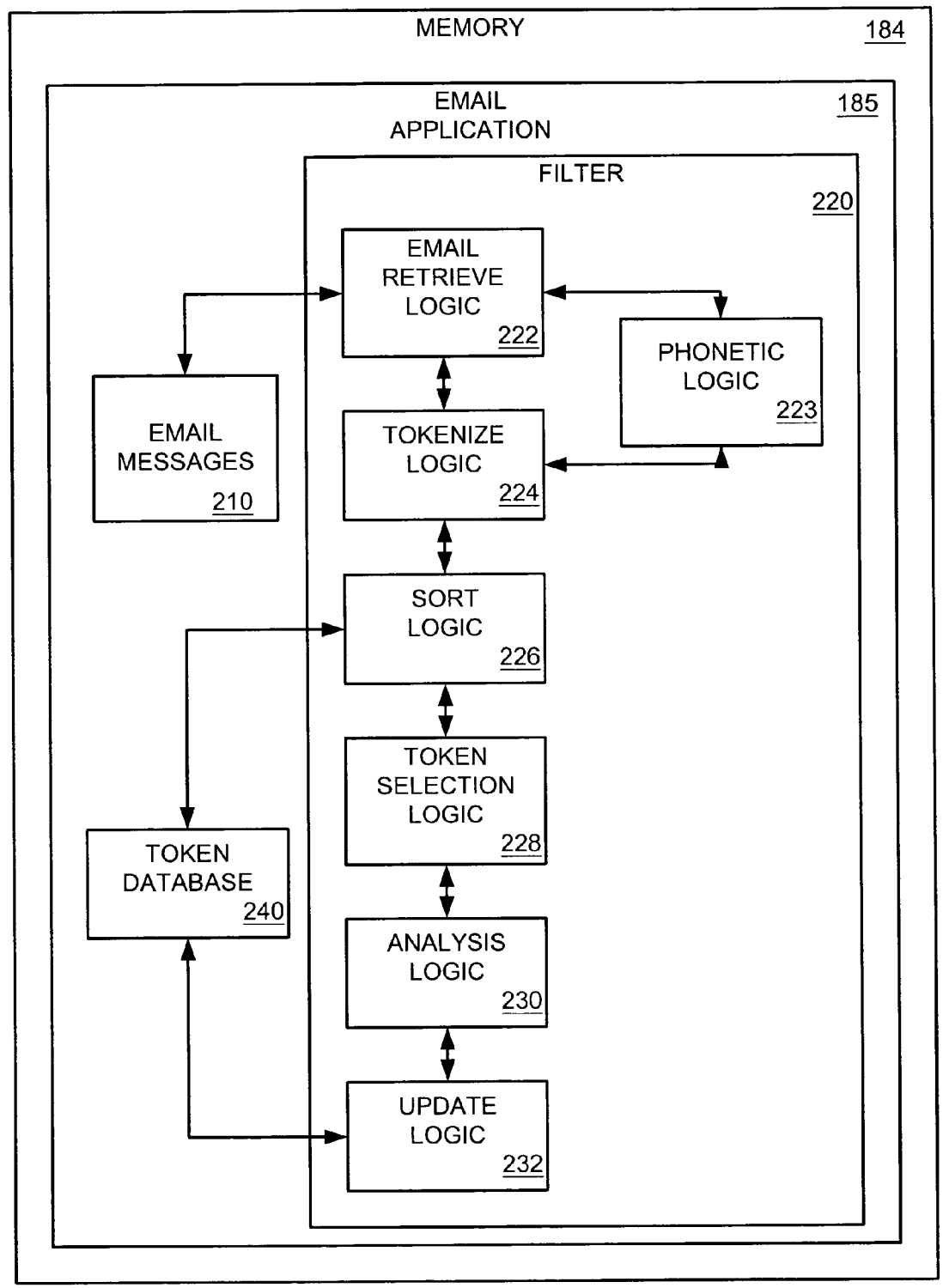
FIG. 2 is a block diagram showing, in greater detail, components in the system of FIG. 1, which may be used to tokenize various portions of email messages.

FIGS. 1 and 2 show embodiments of systems for tokenizing various portions of email messages, and FIGS. 3 through 8B show embodiments of processes for tokenizing various portions of email messages.

FIG. 1 is a block diagram showing an embodiment, among others, of an email environment. As shown in FIG. 1, some embodiments of email systems comprise workstations 172, 174, 176 that are coupled to a server 150 over a network, such as the Internet 180, among others. The server 150 is coupled to a database 162 that stores the email accounts (with mailboxes) of various users.

In the operating environment shown in FIG. 1, a sender of an email message generates the email message at a sender workstation 172 and sends the email message through a network 180 to a recipient at a recipient workstation 176. As shown in FIG. 1, the recipient workstation 176 includes a processor 182, a network interface 190, a memory 184, a local storage device 188, and a bus 186 that permits communication between the various components. While not explicitly shown, it should be appreciated that the other workstations 172, 174 may also include similar components that facilitate computation or execution of applications on the workstations 172, 174. In some embodiments, the local storage device 188 may be a hard drive configured to electronically store data. The local storage device 188 may also store computer programs that execute on the recipient workstation 176. In this sense, the processor 182 is configured to access any program that is stored on the local storage device 188, and execute the program with the assistance of the memory 184. In the embodiment of FIG. 1, an email application 185 is shown as being loaded into memory 184 for launching at the workstation 176, thereby permitting the workstation 176 to send and receive email messages through the network 180. Since the functioning of computing devices is well known in the art, further discussion of the processor 182, the memory 184, and the local storage device 188 are omitted here. However, it should be appreciated that the memory 184 may be either volatile or non-volatile memory.

The network interface 190 is configured to provide an interface between the recipient workstation 176 and the network 180. Thus, the network interface 190 provides the interface for the workstation 176 to receive any data that may be entering from the network 180 and, also, to transmit any data from the workstation 176 to the network 180. Specifically, in some embodiments, the network interface 190 is configured to permit communication between each of the workstations 172, 174, 176 and the server 150 and, additionally, to permit communication among the workstations 172, 174, 176 themselves. In this regard, the network interface 190 may be a modem, a network card, or any other interface that interfaces each of the workstations 172, 174, 176 to the network. Since various network interfaces are known in the art, further discussion of these components is omitted here. It should be understood that various aspects of the email application 185 may be conventional or may be custom tailored to specific needs.

Similar to the workstation 176, the server 150 may also include a processor 152, a memory 154, a network interface 160, and a local hard drive 158, which are in communication with each other over a local bus 156. Since the components 152, 154, 156, 158, 160 at the server 150 perform largely similar functions as the components 182, 184, 186, 188, 190 at the workstation 176, further discussion of the server-side components is omitted here.

FIG. 2 is a block diagram showing, in greater detail, components in the system of FIG. 1, which may be used to tokenize various portions of email messages. As shown in FIG. 2, in some embodiments, the memory 184 is configured to store an email application 185 having a filter 220. In addition to the filter, the embodiment of FIG. 2 shows the memory 185 having email messages 210 and a database of tokens 240 (also referred to herein as a "token database"). The embodiment of FIG. 2 shows a client-based solution (e.g., POP3 client) in which the client performs the filtering. However, it should be appreciated that a server-based solution may be implemented so that the email filtering occurs at the server level, rather than at the client level.

The email messages 210 represent those email messages that have been retrieved from an external mail store such as, for example, from an email server, such as the email server 150 shown in FIG. 1. The token database 240 is a collection of tokens that have been extracted from a set of training email messages that have been previously identified as either spam or legitimate email. Each of the tokens in the token database 240 have a corresponding probability value associated with the token, thereby identifying whether that token is likely associated with spam, or whether that token is likely associated with legitimate email.

The filter 220 is configured to identify spam and distinguish the spam from other legitimate email messages. As such, the filter 220 may be seen as comprising email retrieve logic 222, phonetic logic 223, tokenize logic 224, sort logic 226, token selection logic 228, analysis logic 230, and update logic 232. The email retrieve logic 222 is configured to retrieve one of the email messages 210 from a local mail store for filtering 220. In this regard, the email retrieve logic 222 retrieves an email message from a local mail store once all of the email messages have been retrieved from an email server using, for example, POP3 or IMAP4 or other similar protocols. The email retrieve logic 222 relays the retrieved email message to the tokenize logic 224 and the phonetic logic 223. The phonetic logic 223 is configured to receive the email message and generate phonetic equivalents of those words in the email message that have phonetic equivalents. An embodiment of a process for generating phonetic equivalents is shown with reference to FIGS. 8A and 8B. The phonetic equivalents are conveyed to the tokenize logic 224 along with the original email message. The tokenize logic 224 is configured to receive the email message from the email retrieve logic 222 and the phonetic equivalents from the phonetic logic 223. The received information is used to generate tokens. The generating of tokens is also described herein as "tokenizing."

In some embodiments, tokens may be generated from various portions of the email message, such as, for example, the words in the subject of the email message, the words in the body of the email message, the SMTP address, the domain name associated with the SMTP address (as described above), any attachments to the email message, etc. Several processes for generating tokens are discussed below with reference to FIGS. 3 through 7. The generated tokens are conveyed to the sort logic 226. The sort logic 226 receives the tokens and accesses the token database 240 to determine whether or not the tokens already exist in the token database 240. If the token does not exist in the token database 240, then the sort logic 226 assigns a probability value to the token. The probability may be assigned using known methods, such as those described in the Graham article. If the token exists in the token database 240, then the probability associated with that token is retrieved from the token database 240. Once the token is assigned a probability, or the probability of the token has been determined using the token database 240, the extracted tokens are sorted by the sort logic 226.

Upon sorting the tokens, the most interesting tokens are selected by the token selection logic 228. In some embodiments, the most interesting tokens may be the fifteen tokens that are furthest from a neutral probability of, for example, 0.5. In other embodiments, the most interesting tokens may be determined according to other known algorithms. Regardless of how the most interesting tokens are determined, the token selection logic 228 selects those tokens that are determined to be suitable for analysis. The selected tokens are then provided to the analysis logic 230 for analysis. In some embodiments, the analysis logic 230 performs a Bayesian analysis using the selected tokens. Since Bayesian analysis is known in the art, as evidenced by the Graham article, further discussion of Bayesian analysis is omitted here. It should, however, be appreciated that the analysis of the selected tokens may be performed using other methods known in the art. The analysis logic 230, upon performing the analysis, produces a result that indicates whether the email message is spam, or whether the email message is legitimate email. Once the email message has been categorized as either spam or legitimate, the update logic 232 updates the token database 240 with the tokens extracted from the latest email message. Hence, as the filter 220 receives and categorizes emails, the token database 240 is continually updated, thereby resulting in an adaptively learning filter 220. In other words, if new tokens are extracted from the email message, then the token database 240 is updated by adding those new tokens (and their associated probability values) to the token database 240. If already-existing tokens are extracted from the email message, then the token database 240 is updated by updating the corresponding token probability value.

As shown in the embodiments of FIGS. 1 and 2, some embodiments of the invention tokenize those portions of email messages (e.g., SMTP address, domain portion of the SMTP address, attachments, etc.) that were previously not tokenized. Thus, by expanding the database of tokens, the filter 220 exhibits greater resilience in combating spam. Additionally, by tokenizing the phonetic equivalents of various words, a more rigorous spam filter is provided.

Having described several embodiments of systems for tokenizing portions of email messages that were previously not tokenized, attention is turned to FIGS. 3 through 8B, which show embodiments of processes for tokenizing portions of email messages.

Figure 3:
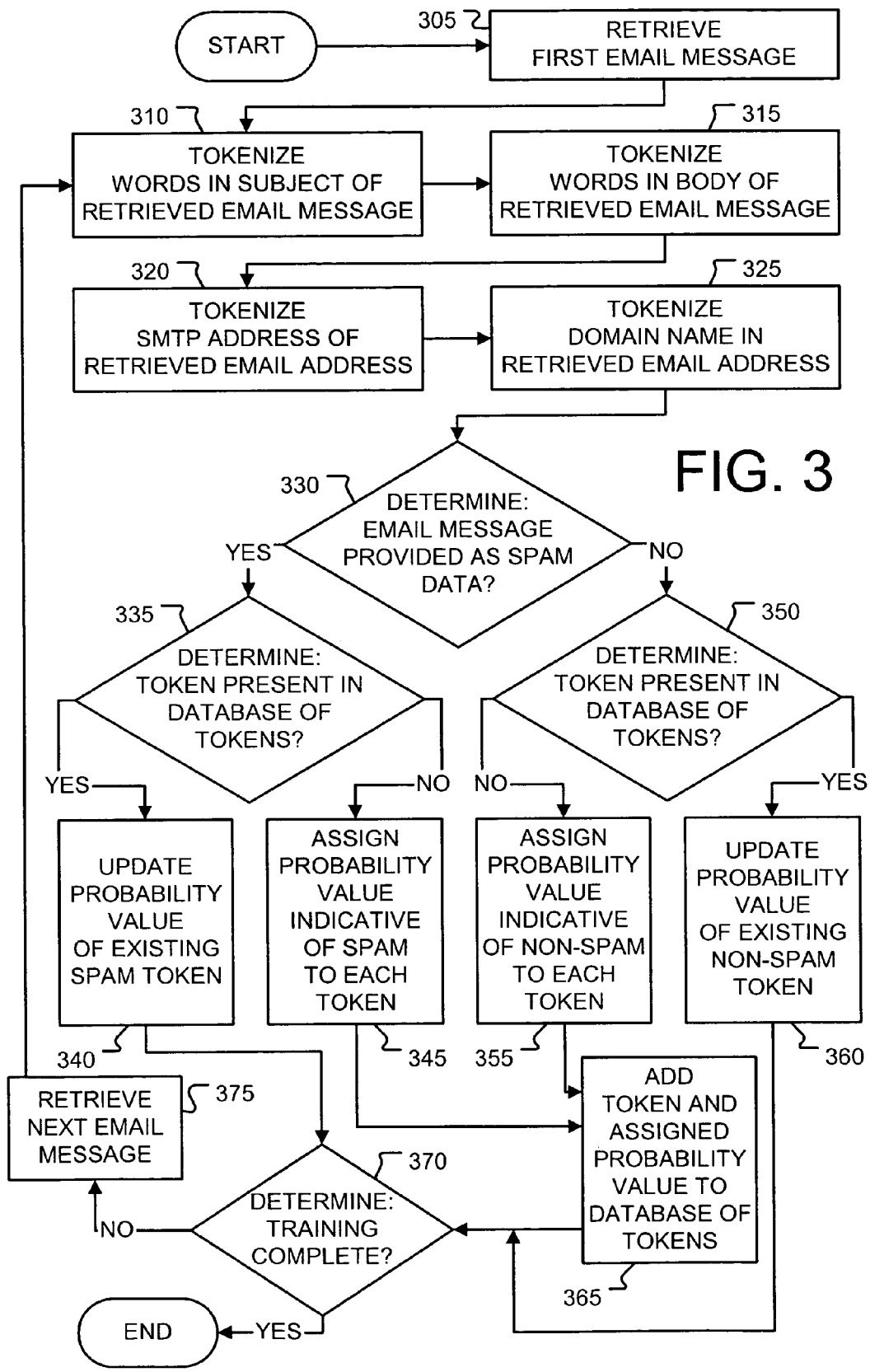
FIG. 3 is a flowchart showing an embodiment of a process for training a Bayesian filter with tokenized simple mail transfer protocol (SMTP) addresses and domain names.

FIG. 3 is a flowchart showing an embodiment of a process for training a Bayesian filter with tokenized simple mail transfer protocol (SMTP) addresses and domain names. While Bayesian filters are specifically used to demonstrate various aspects of the invention, it should be appreciated that other spam-combating methods may be utilized in conjunction with the various embodiments described herein.

As shown in FIG. 3, some embodiments of the training process begin when an email message is retrieved (305). The words in the subject line of the email message are tokenized (310). Additionally, the words in the body of the email message are tokenized (315). In addition to the body of the email message and the subject line, the SMTP address and the domain name are tokenized (320, 325). The tokenizing of the words is shown in greater detail with reference to FIG. 7.

During the training process, the retrieved email message may be either a spam email message or a legitimate email message. Stated differently, both spam messages and legitimate messages are provided in order to train the system to adaptively learn the characteristics of both spam and legitimate email. Since various methods, such as, for example, Bayesian probability methods, are known in the art for training adaptive filters, only a truncated discussion of training processes is provided below.

In order to categorize the email message as either spam or legitimate, a user is, in some embodiments, prompted to categorize the email message as either legitimate or spam. Thus, once the various portions of the email message are tokenized (310, 315, 320, 325) to generate corresponding tokens, and the user has provided input on whether or not the email message is spam, the system determines (330) whether or not the retrieved email message is provided as training data for spam (also referred to herein as "spam data") or training data for legitimate email. If the email message is provided as spam data, then the system further determines (335) whether or not the tokens are present in a database of tokens. In doing so, if a token is already present in the database, then the probability of the existing token is updated (340) to reflect a different spam probability value. If the token is not present then a probability value is assigned (345) to the token to indicate that it is associated with spam. The token and its corresponding probability value are then added (365) to the database of tokens.

If the email message, however, is not provided as spam data (i.e., the email message is provided as training data for legitimate email messages), then the email message is used to update the non-spam tokens in the database. Hence, once the system determines (330) that the email message is not provided as spam data, the system further determines (350)

whether or not the tokens are present in the database of tokens. In doing so, if a token is present in the database, then the probability of the existing token is updated (360) to reflect a different non-spam probability value. If the token is not present, then a probability value is assigned (355) to the token to indicate that it is not associated with spam. The token and its corresponding probability are then added (365) to the database of tokens.

Upon adding (365) the tokens and assigned probability values to the database of tokens, the system further determines (370) whether or not the training of the Bayesian filter is complete. In some embodiments, the training of the Bayesian filter may be complete when a sufficient number of email messages (e.g., 500 email messages) have been used for training the filter. In other embodiments, the training may be complete when the probability values of the tokens do not result in a significant statistical change. In any event, if the system determines (370) that the training is not complete, then another email message is retrieved (375) and the process repeats by tokenizing the portions of that email message. If the system determines (370) that the training is complete, then the training process terminates.

While an embodiment of the training process is shown in which both spam and legitimate email messages are provided from a pre-existing store of email messages, it should be appreciated that the training process may be conducted in an interactive manner. For those embodiments, newly-received email messages may be provided to a user so that the user may manually categorize those email messages as either spam or legitimate email. Once the user has manually categorized the newly-received email message as either spam or legitimate email, the token database can be updated in a manner similar to that described above. Since such interactive approaches are described in the Graham article, further discussion of interactive training processes is omitted here.

Figure 4:
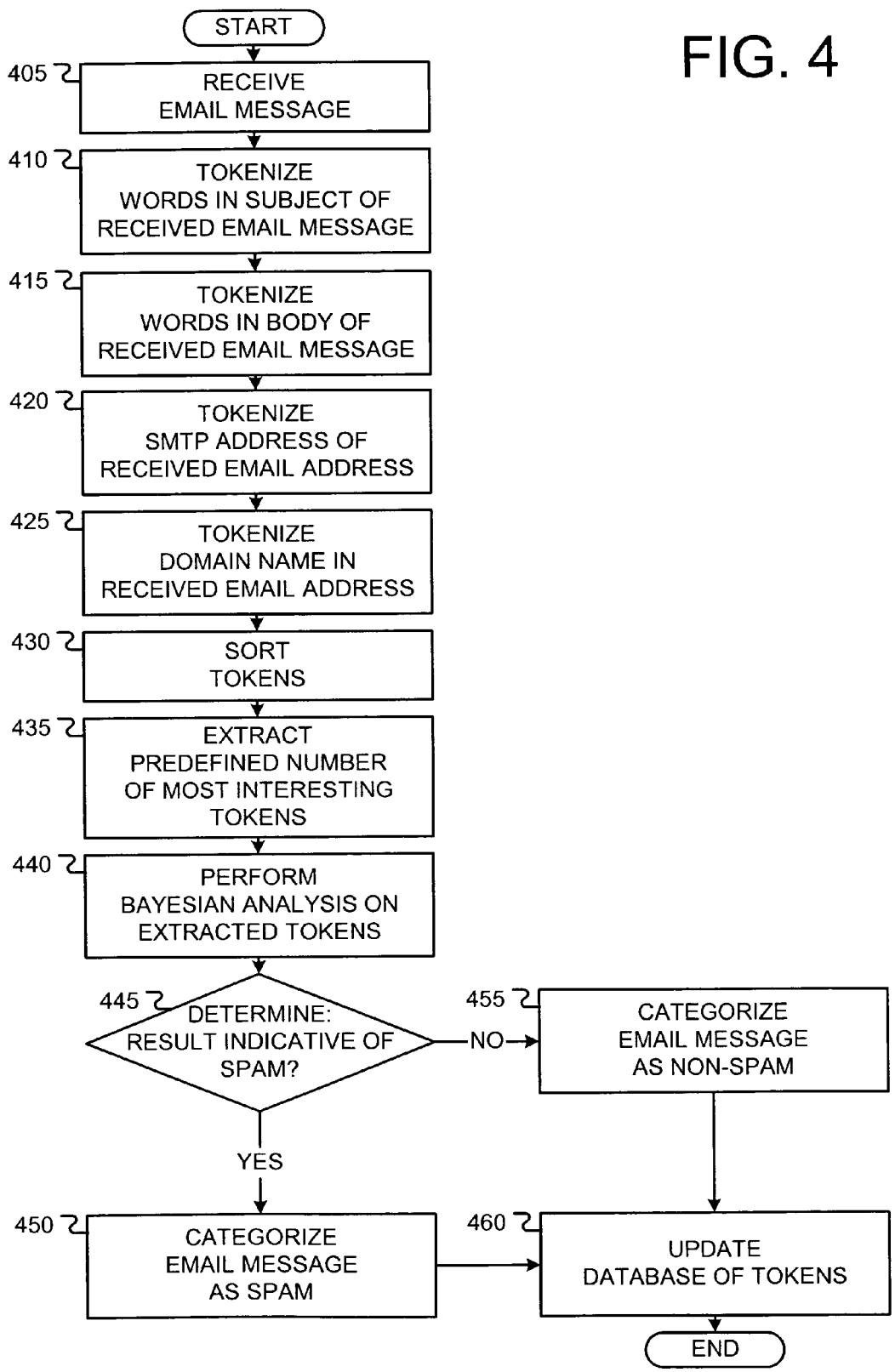
FIG. 4 is a flowchart showing an embodiment of a process for identifying spam using the Bayesian filter trained in accordance with the method of FIG. 1.

Once the Bayesian filter has been trained to segregate spam from legitimate email messages, the Bayesian filter may be used to identify incoming spam. FIG. 4 is a flowchart showing an embodiment of a process for identifying spam using the Bayesian filter trained in accordance with the method of FIG. 1. As shown in FIG. 4, some embodiments of processes for identifying spam begin when an email message is received (405). Upon receiving (405) the email message, the words in the subject line are tokenized (410). Similarly, the words in the body of the email message are also tokenized (415). In addition to the subject line and the body of the email message, the SMTP address of the email message is tokenized (420) and the domain name associated with the sender of the email address is tokenized (425). The tokenizing of the various portions of the email message produce tokens that are then sorted (430).

In some embodiments, the tokens may be sorted (430) in accordance with their corresponding probability value (e.g., probability of being spam or probability of being legitimate). Once sorted (430), a predefined number of most interesting tokens are extracted (435). The most interesting tokens may be those tokens having the greatest non-neutral probabilities. While not explicitly shown, it should be appreciated that the predefined number may be any number that provides a statistically reliable segregation of spam from legitimate email. This number may be derived empirically by trial and error.

Once the most interesting tokens have been extracted (435), a Bayesian analysis is performed (440) on the most interesting tokens. The Bayesian analysis provides a result, which is indicative of a probability that the email message is either spam or legitimate email. Given the result of the Bayesian analysis, the system then determines (445) whether or not the result is indicative of spam. If the result is indicative of spam, then the email message is categorized (450) as spam. If the result is not indicative of spam, then the email message is categorized (455) as non-spam. In either event, the database of tokens is updated (460) to reflect the contribution of the new tokens, and the process ends until the next email message is received.

As shown in FIG. 4, by tokenizing (415, 420) the SMTP email address and its corresponding domain name, more information is provided for the analysis than provided by prior systems. Hence, greater reliability may be achieved with the additional information.

Figure 5:
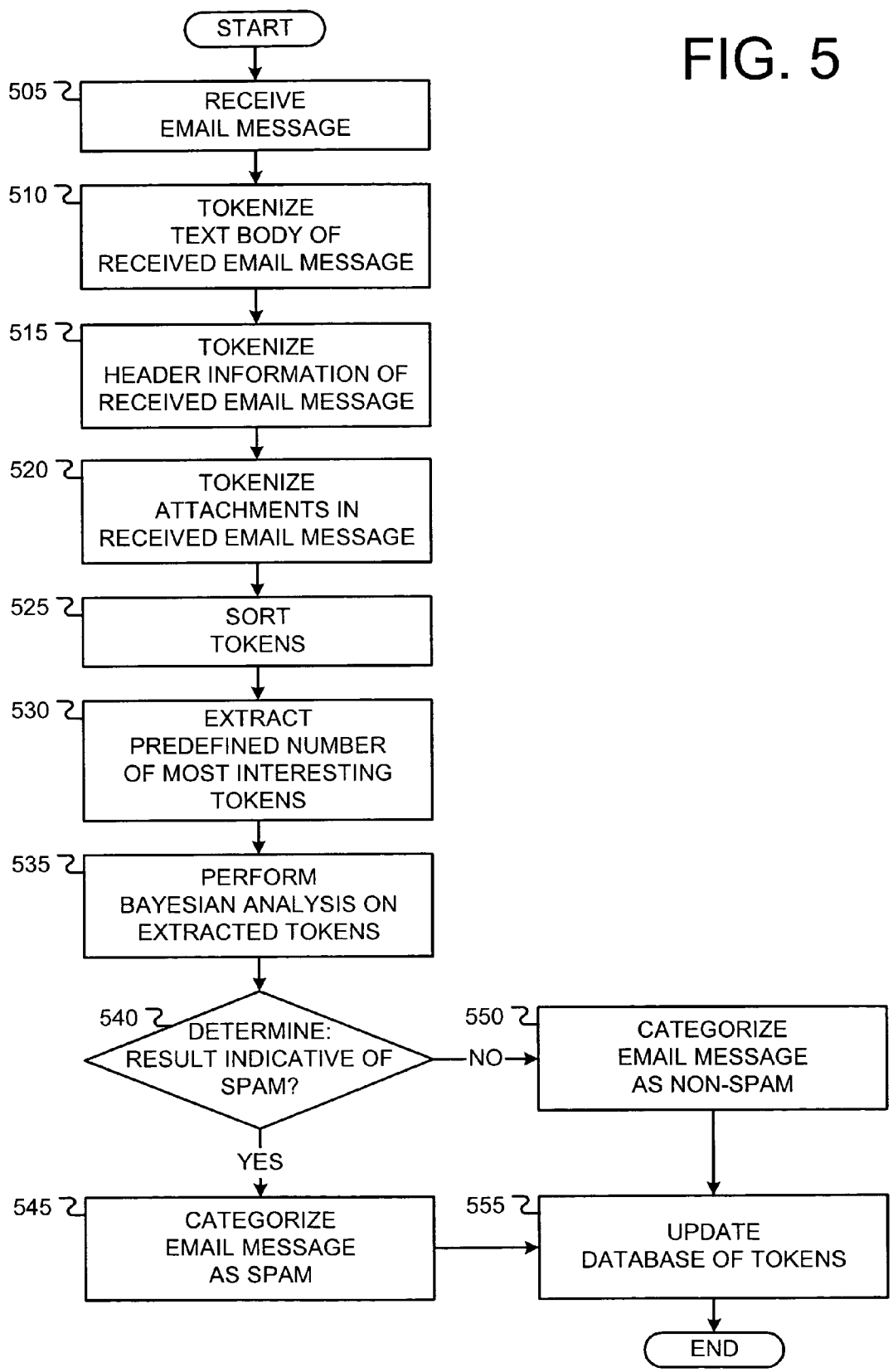
FIG. 5 is a flowchart showing an embodiment of a process for tokenizing attachments, thereby permitting identification of spam having attachments.

FIG. 5 is a flowchart showing an embodiment of a process for tokenizing attachments, thereby permitting identification of spam having attachments. The process of FIG. 5 begins after a training process has been completed. In other words, various email messages having attachments may be manually categorized as described above and, also, as described in the Graham article, or, in other embodiments, automatically categorized. Upon manual categorization of various email messages, a token database 240 is produced (or updated, if a token database 240 already existed). The token database 240 includes various tokens (including tokens associated with images or attachments, as described below with reference to FIG. 6) and various probability values that correspond to those tokens. Stated differently, FIG. 5 presupposes that the spam training has been completed (as described above) and, hence, the adaptive filter is set to filter newly received email messages.

As shown in FIG. 5, some embodiments of processes for identifying spam begin when an email message is received (505). Upon receiving (505) the email message, the body of the email message is tokenized (510). Additionally, the information in the header of the email message is also tokenized (515). Unlike prior systems, the embodiment of FIG. 5 further tokenizes (520) attachments that may be present in the email message. The tokenizing (520) of attachments is described in greater detail in FIG. 6. The tokenizing of the various portions of the email message produce tokens that are then sorted (525).

In some embodiments, the tokens may be sorted (525) in accordance with their corresponding probability value (e.g., probability of being spam or probability of being legitimate). Once sorted (525), a predefined number of most interesting tokens are extracted (530). Again, the most interesting tokens may be those tokens having the greatest non-neutral probabilities.

Once the most interesting tokens have been extracted (530), a Bayesian analysis is performed (535) on the most interesting tokens. The Bayesian analysis provides a result, which is indicative of a probability that the email message is either spam or legitimate email. Given the result of the Bayesian analysis, the system then determines (540) whether or not the result is indicative of spam. If the result is indicative of spam, then the email message is categorized (545) as spam. If the result is not indicative of spam, then the email message is categorized (550) as non-spam. In either event, the database of tokens is updated (555) to reflect the contribution of the new tokens, and the process ends until the next email message is received.

As shown in FIG. 5, by tokenizing (520) attachments, more information is provided for the analysis than provided by prior systems. This additional information deters spammers from using attachments to distribute spam.

Figure 6:
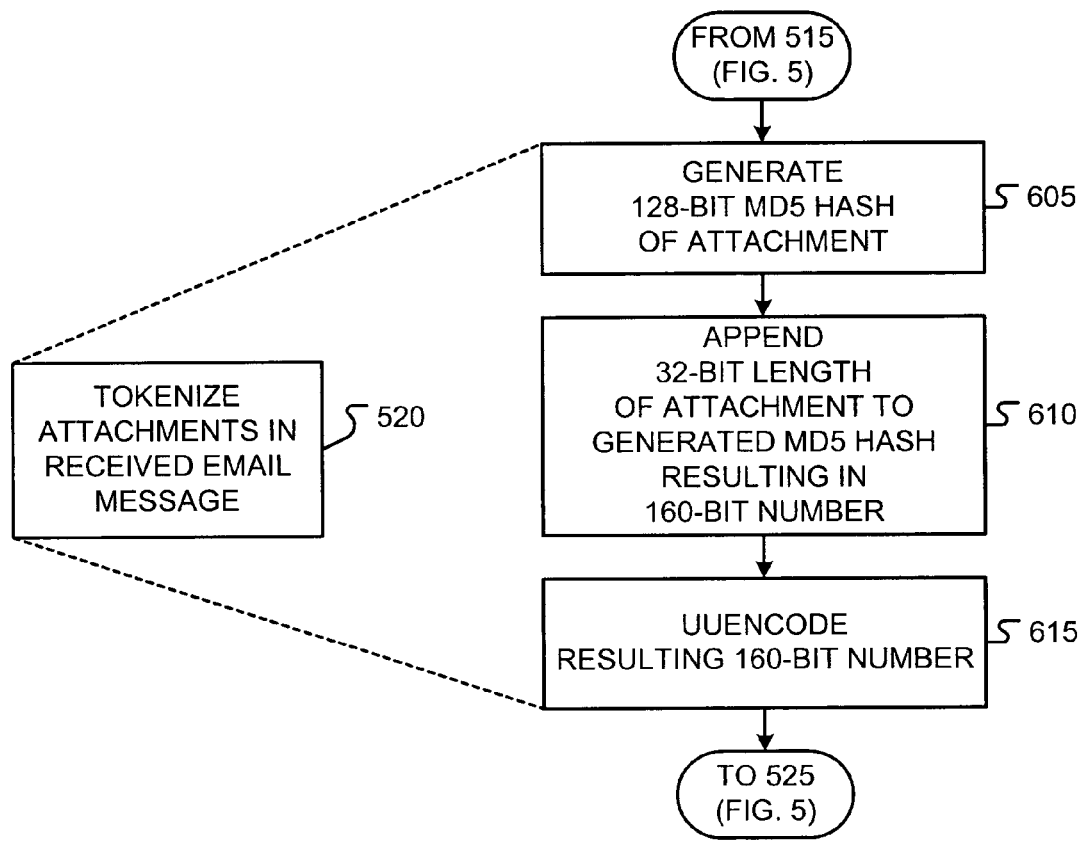
FIG. 6 is a flowchart showing, in greater detail, the step of tokenizing an attachment in FIG. 5.

FIG. 6 is a flowchart showing, in greater detail, the tokenizing step of FIG. 5. Since attachments are relatively large in size compared to text messages, tokenizing the attachment without modification may result in an extremely large token database, which may not be practical. In order to alleviate this problem, any attachments to an email message are tokenized by generating a unique "fingerprint" of the attachment, which occupies less space. In the embodiment below, the attachment is presumed to have a 32-bit length associated with the attachment. However, it should be appreciated that other systems may not be limited to the exact bit numbers described below.

In some embodiments, attachments are tokenized (520) by generating (605) a 128-bit MD5 hash of the attachment. As is known in the art, as evidenced by RFC 1321, published in April 1992 by the Network Working Group, which is incorporated herein by reference as if set forth in its entirety, the MD5 hash produces a fingerprint of a document that is relatively unique to the document. Since MD5 is known in the art, further discussion of MD5 is omitted here. Upon generating (605) the MD5 hash, the 32-bit length of the attachment is appended (610) to the tail end of the MD5 hash, thereby producing a 160-bit number in which the upper 128-bits represent the MD5 hash of the attachment. In some embodiments, the 160-bit number is thereafter UUencoded (615) for storage. The UUencoding (615) of the 160-bit number results in a 28-byte (or octet) string that may be injected into an XML stream or other digital communication stream.

Figure 7:
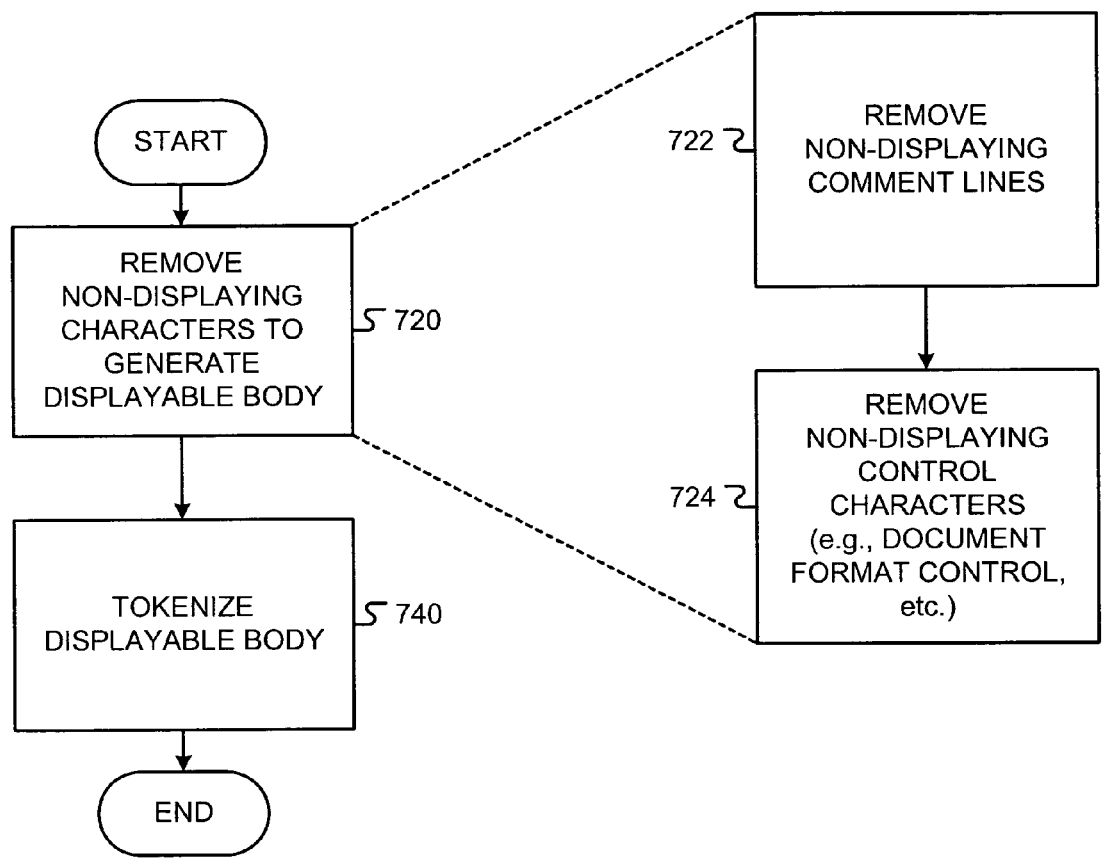
FIG. 7 is a flowchart showing, in greater detail, the step of tokenizing text in FIGS. 3 through 5.

FIG. 7 is a flowchart showing, in greater detail, the step of tokenizing text in FIGS. 3 through 5. The embodiment shown in FIG. 7 may be employed to tokenize text in the subject line, the body of the email message, and/or the header, in addition to other portions of the email message that may contain text or other displayable characters.

As shown in FIG. 7, in some embodiments, the process may begin by removing (720) non-displaying characters from an email message to generate a displayable body of characters. The displayable body of characters is then tokenized (740) using known methods. The step of removing (720) the non-displaying characters may include the steps of removing (722) comment lines, which are normally not displayed to the end user when the email message is rendered for display. The step of removing (720) the non-displaying characters may also include the step of removing (724) control characters. The control characters may include document control characters such as, for example, font controls in hypertext markup language (HTML), border controls, etc. In this regard, some embodiments of the process may employ known methods, such as MSHTML or other development tools from Microsoft®. Since such tools are known to those of skill in the art, further discussion of MSHTML and other Microsoft® developer tools is omitted here. In other embodiments, the process may search for non-displaying characters, such as, for example, HTML tags or extensible markup language (XML) tags and their respective arguments. The HTML and XML tags, and their respective arguments, may be removed (or ignored) in order to determine the displayable characters. Often, the displayable characters will provide the text as it will be rendered for the end user. Hence, by tokenizing the displayable characters, greater precision in spam filtering may be achieved.

Figure 8A:
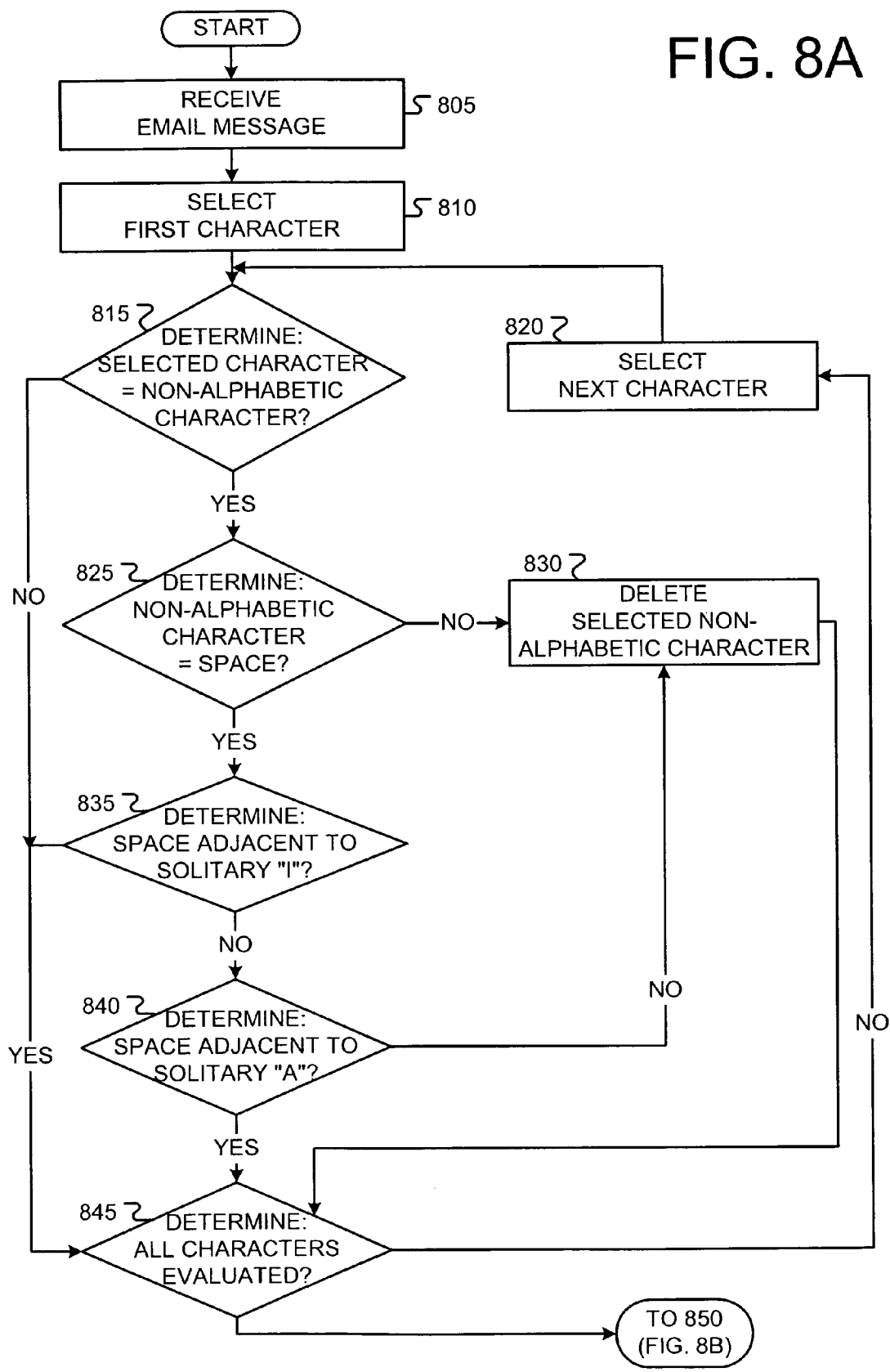
FIGS. 8A and 8B are flowcharts showing an embodiment of a process for segregating spam and non-spam on the basis of phonetic equivalents of words in an email message.
Figure 8B:
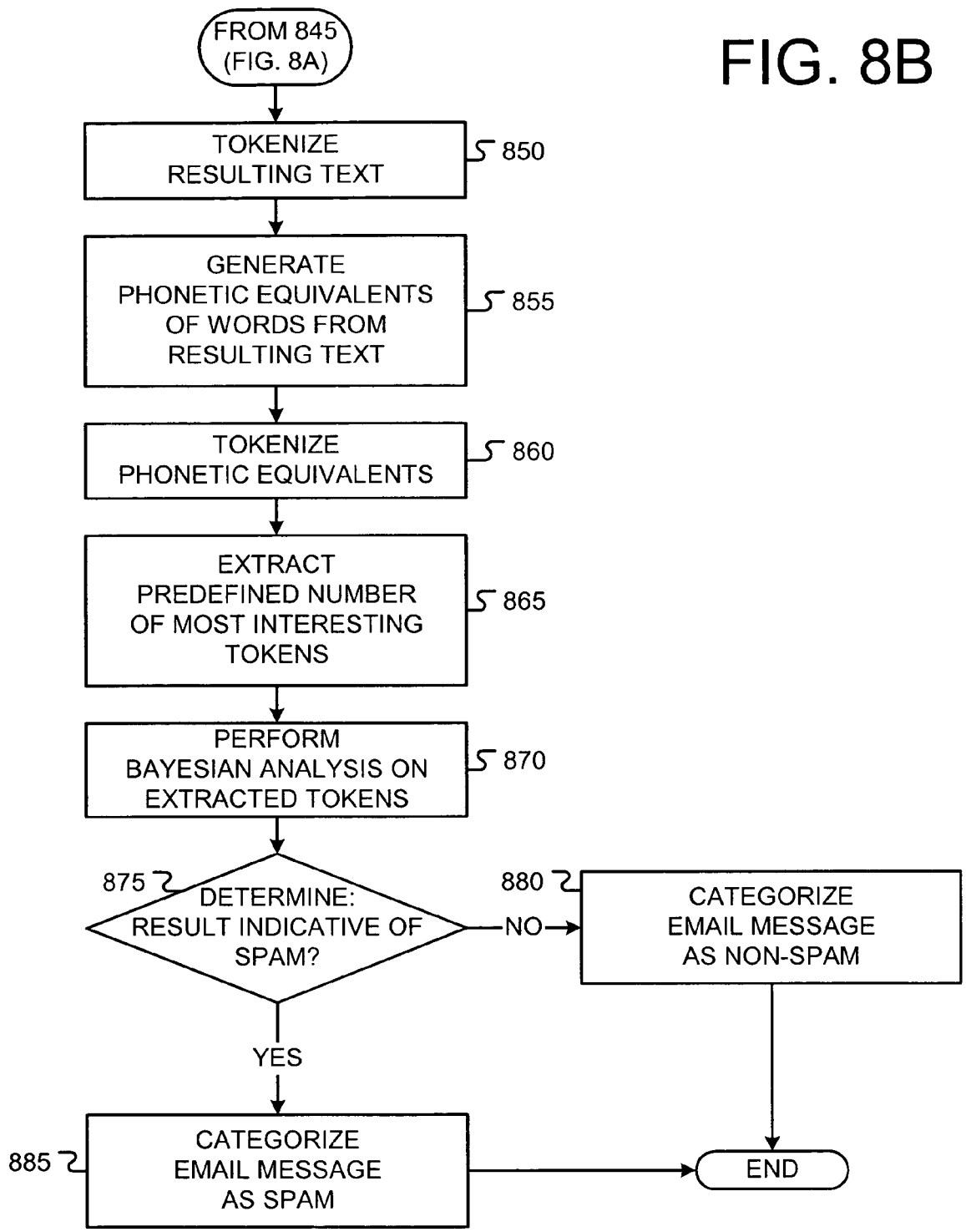

FIGS. 8A and 8B are flowcharts showing an embodiment of a process for segregating spam and non-spam on the basis of phonetic equivalents of words in an email message. As shown in FIG. 8A, an embodiment of the process begins when an email message is received (805). Upon receiving (805) the email message, the text portion of the email message (e.g., subject line, text body, header, etc.) is filtered for non-alphabetic characters (e.g., numbers, "$," "#," "@," etc.).

In filtering for non-alphabetic characters, the first character of the email message is selected (810), and the system determines (815) whether or not the selected character is a non-alphabetic character. If the selected character is an alphabetic character, then the system determines (845) whether or not there are any other characters in the email message. If there are no additional characters in the email message, then the process continues to FIG. 8B. However, if there are additional characters in the email message, then the next character is selected (820), and the system determines, again, whether or not the selected character is a non-alphabetic character.

If the selected character is a non-alphabetic character, then the system further determines (825) whether or not the non-alphabetic character is a space (i.e., " ") character. If the non-alphabetic character is not a space character, then that character is deleted (830), and the system again determines whether or not there are other characters in the email message. If there are other characters in the email message, then the next character is selected (815).

In some embodiments, if the non-alphabetic character is a space character, then the system further determines (835) whether or not the space character is adjacent to a solitary letter "I." The reason for this determination is that the letter "I" is one of the few characters in the English language that also represents an entire word (i.e., the singular first person pronoun). Thus, it is often the case where the letter "I" is immediately surrounded by space characters.

If the system determines (835) that the space character is not adjacent to a solitary "I," then the system deletes (830) the space character, and the process repeats as described above. If, however, the system determines (835) that the space character is adjacent to a solitary "I," then the system further determines (840) whether or not the space character is adjacent to a solitary "a," since the letter "a" is also a character that represents an entire word in the English language.

If the space character is not adjacent to a solitary letter "a," then the system deletes (830) the space character. However, if the space character is adjacent to a solitary letter "a," then the system proceeds to evaluate whether or not all of the characters in the email message have been evaluated. If all of the characters in the email message have been evaluated according to the process described above, then the process continues to FIG. 8B. If, however, all of the characters have not been evaluated according to the process described above, then the system selects (815) the next character, and the process repeats until the entire email message has been evaluated.

Continuing in FIG. 8B, once all of the non-alphabetic characters have been removed from the email message, the resulting text is tokenized (850). Additionally, a phonetic equivalent of the resulting text is generated (855) for each word in the text that has a phonetic equivalent. The phonetic equivalents are also tokenized (860). From the resulting tokens, a predefined number of most interesting tokens is extracted (865), and a Bayesian analysis is performed (870) on the extracted tokens. Since Bayesian analysis and extraction of most interesting tokens is described above, further discussion of these processes is omitted here.

Upon completing the Bayesian analysis, the system determines (875) whether or not the result is indicative of the email message being spam. If the email message falls within the range of spam, as indicated by the result of the Bayesian analysis, then the email message is categorized (885) as spam, and the process terminates. Alternatively, if the email message falls outside the range of spam, then the email message is categorized (880) as non-spam, and the process terminates.

As shown from FIGS. 3 through 8B, the several embodiments of the processes provide an approach to categorizing normally-non-tokenized segments of an email message as either spam or non-spam, thereby preventing spammers from circumventing the filter by using other methods to convey spam.

The email retrieve logic 222, the phonetic logic 223, the tokenize logic 224, the sort logic 226, the token selection logic 228, the analysis logic 230, the update logic 232, and other logic components for carrying out various functions of the present invention can be implemented in hardware, software, firmware, or a combination thereof. In the preferred embodiment(s), the email retrieve logic 222, the phonetic logic 223, the tokenize logic 224, the sort logic 226, the token selection logic 228, the analysis logic 230, the update logic 232, and other logic components for carrying out various functions are implemented in software or firmware that is stored in a memory and that is executed by a suitable instruction execution system. If implemented in hardware, as in an alternative embodiment, the email retrieve logic 222, the phonetic logic 223, the tokenize logic 224, the sort logic 226, the token selection logic 228, the analysis logic 230, the update logic 232, and other logic components for carrying out various functions can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The email application 185 and the filter 220 may be implemented as computer programs, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations may be made, none of which depart from the spirit of the present invention. For example, while Bayesian filters have been used to illustrate various embodiments, it should be appreciated that the token-generating systems and methods described above may be used in conjunction with any type of spam-identifying system. Additionally, while several embodiments have been described in the context of spam, it should be appreciated that the token-generating systems and methods described above may be used in any type of filtering system. Also, while MD5 is explicitly provided as one method of generating a fingerprint of a document, it should be appreciated that other encoding or compressing algorithms may be used to generate the fingerprint of the document. Also, while client-solutions are presented in great detail, it should be appreciated that similar filtering processes may be implemented at the server side. For those embodiments having both client-side and server-side processes, it should be appreciated that the token databases at the server and the client may be mirrored so that both the server-side and client-side token databases are updated with each newly received email message. In other words, if the server-side database is updated, then the updated database may be downloaded to the client-side to maintain an updated copy of the database at the client. Similarly, if the client-side database is updated, then the updated database may be uploaded to the server-side to maintain an updated copy of the database at the server. All such changes, modifications, and alterations should therefore be seen as within the scope of the present invention.

What is claimed is:
1. A method comprising:
receiving a first email message from a simple mail transfer protocol server, the first email message comprising displaying characters and non-displaying characters, the non-displaying characters including non-displaying comments and non-displaying control characters; the first email message further comprising:
 a 32-bit string indicative of a length of the first email message;
 a text body;
 a simple mail transfer protocol email address that includes a user name and a domain name;
 an attachment;
searching for the non-displaying characters in the first email message;
removing the non-displaying characters, including the non-displaying comments and the non-displaying control characters;
determining non-alphabetic displaying characters in the first email message, where determining the non-alphabetic displaying characters includes a per-character analysis that recursively determines for each character whether:
 a character is a non-alphabetic character;
 if the character is a non-alphabetic character, whether the character is a space;
 if the character is a space, determine whether the space is adjacent to a solitary "i" or "a";
 in response to a determination that the space is not adjacent to a solitary "i" or "a", deleting the non-alphabetic character; and if the non-alphabetic character is not a space, filtering the determined non-alphabetic displaying characters from the first email message;

generating a phonetic equivalent for each word that includes only alphabetic displaying characters that has a phonetic equivalent;

tokenizing the phonetic equivalents in a displaying portion of the text body to generate a plurality of body tokens representative of words in the text body;

tokenizing the simple mail transfer protocol email address to generate an address token representative of the simple mail transfer protocol email address;

tokenizing the domain name to generate a domain token that is representative domain name;

tokenizing the attachment to generate an attachment token that is representative of the attachment, wherein tokenizing comprises:

generating a 128-bit MD5 hash of the attachment;

appending the 32-bit string to the generated MD5 hash to produce a 160-bit number; and UUencoding the 160-bit number to generate the attachment token representative of the attachment;

determining a corresponding spam probability value for each of the plurality of body tokens, the address token, the domain token, and the attachment token;

determining whether at least one of the plurality of body tokens, the address token, the domain token, and the attachment token is present in a database of tokens and, in response to a determination that at least one of the plurality of body tokens, the address token, the domain token, and the attachment token is present in the database of tokens:

updating the spam probability value of the plurality of body tokens, the address token, the domain token, and the attachment token; and sorting the plurality of body tokens, the address token, the domain token, and the attachment token in accordance with the corresponding spam probability value to determine a predefined number of interesting tokens, the predefined number of interesting tokens being a subset of the plurality of body tokens, the address token, the domain token, and the attachment token;

classifying the plurality of body tokens, the address token, the domain token, and the attachment token as spam, non-spam, or neutral;

selecting the predefined number of interesting tokens, to create selected interesting tokens, the selected interesting tokens being the plurality of body tokens, the address token, the domain token, and the attachment token having a greatest non-neutral probability values;

performing a Bayesian analysis on the selected interesting tokens to generate a spam probability;

categorizing the first email message as a function of the spam probability; and filtering a second email message.

2. The method of claim 1, wherein the first email message is received at a computing device.

3. A method comprising:

receiving, at a computing device, a first email message comprising a text body, a simple mail transfer protocol email address, an attachment, and a domain name corresponding to the simple mail transfer protocol email address, the text body including displaying characters and non-displaying characters;

searching for the non-displaying characters in the first email message;

removing the searched non-displaying characters, including non-displaying comments and non-displaying control characters;

determining non-alphabetic displaying characters in the first email message, where determining the non-alphabetic displaying characters includes a per-character analysis that recursively determines for each character whether:

a character is a non-alphabetic character;

if the character is a non-alphabetic character, whether the character is a space;

if the character is a space, determine whether the space is adjacent to a solitary "i" or "a";

in response to a determination that the space is not adjacent to a solitary "i" or "a", deleting the non-alphabetic character; and if the non-alphabetic character is not a space, filtering the determined non-alphabetic displaying characters from the first email message;

tokenizing the simple mail transfer protocol email address to generate an address token representative of the displaying characters of the simple mail transfer protocol email address;

tokenizing the attachment to generate an attachment token that is representative of the attachment;

tokenizing the domain name to generate a domain token representative of the domain name;

determining a corresponding spam probability value from the address token, the attachment token, and the domain token;

determining whether at least one of the address token, the attachment token, and the domain token is present in a database of tokens and, in response to a determination that at least one of the address token, the attachment token, and the domain token is present in the database of tokens:

updating the spam probability value of at least one of the address token, the attachment token, and the domain token;

sorting the address token, the attachment token, and the domain token in accordance with the corresponding spam probability value to determine a predefined number of interesting tokens, the predefined number of interesting tokens being a subset of the address token, the attachment token, and the domain token; and filtering a second email message.

4. The method of claim 3, wherein determining the spam probability comprises:

assigning an address spam probability value to the address token representative of the simple mail transfer protocol email address;

assigning a domain spam probability value to the domain token representative of the domain name; and generating a Bayesian probability value using the address spam probability and the domain spam probability assigned to the address token and the domain token.

5. The method of claim 4, wherein determining the spam probability further comprises:

comparing the Bayesian probability value with a predefined threshold value.

6. The method of claim 5, wherein determining the spam probability further comprises:

categorizing the first email message as spam in response to the Bayesian probability value being greater than the predefined threshold.

7. The method of claim 5, wherein determining the spam probability further comprises:
categorizing the first email message as non-spam in response to the Bayesian probability value being not greater than the predefined threshold.

8. The method claim 3, wherein receiving the first email message further comprises:
receiving the first email message including a text body.

9. The method of claim 8, further comprising:
tokenizing the words in the text body to generate body tokens representative of the words in the text body.

10. The method of claim 9, wherein determining the spam probability comprises:
assigning a body spam probability value to each of the body tokens representative of the words in the text body;
assigning an attachment spam probability value to the attachment token representative of the attachment; and
generating a Bayesian probability value using the body spam probability value and the attachment spam probability value assigned to the body tokens and the attachment token.

11. The method of claim 10, wherein determining the spam probability further comprises:
comparing the Bayesian probability value with a predefined threshold value.

12. The method of claim 11, wherein determining the spam probability further comprises:
categorizing the first email message as spam in response to the Bayesian probability value being greater than the predefined threshold.

13. The method of claim 11, wherein determining the spam probability further comprises:
categorizing the first email message as non-spam in response to the Bayesian probability value being not greater than the predefined threshold.

14. A system comprising:
a memory component that stores at least the following:
email receive logic configured to receive a first email message comprising a simple mail transfer protocol email address, a domain name corresponding to the simple mail transfer protocol email address, and an attachment, the first email message further including displaying characters and non-displaying characters;
searching logic configured to search for the non-displaying characters in the first email message;
removing logic configured to remove the non-displaying characters, including non-displaying comments and non-displaying control characters;
first determine logic configured to determine non-alphabetic displaying characters in the first email message, where determining the non-alphabetic displaying characters includes a per-character analysis that recursively determines for each character whether:
a character is a non-alphabetic character;
if the character is a non-alphabetic character, whether the character is a space;
if the character is a space, determine whether the space is adjacent to a solitary "i" or "a";
in response to a determination that the space is not adjacent to a solitary "i" or "a", deleting the non-alphabetic character; and
if the non-alphabetic character is not a space, filtering the determined non-alphabetic displaying characters from the first email message;

tokenize logic configured to tokenize the simple mail transfer protocol email address to generate an address token representative of the simple mail transfer protocol email address;
tokenize logic configured to tokenize the attachment to generate an attachment token that is representative of the attachment;
tokenize logic configured to tokenize the domain name to generate a domain token representative of the domain name;
analysis logic configured to determine a corresponding spam probability value from the address token, the attachment token, and the domain token; and
second determine logic configured to determine whether at least one of the address token, the attachment token, and the domain token is present in a database of tokens and, in response to a determination that at least one of the address token, the attachment token, and the domain token is present in the database of tokens:
update the corresponding spam probability value of the address token, the attachment token, and the domain token;
sort the address token, the attachment token, and the domain token in accordance with the corresponding spam probability value to determine a predefined number of interesting tokens, the predefined number of interesting tokens being a subset of the address token, the attachment token, and the domain token, wherein only displaying characters are tokenized; and
filter a second email message.

15. A non-transitory computer-readable storage medium that includes a program that, when executed by a computer, performs at least the following:
receive a first email message comprising a simple mail transfer protocol email address, a domain name corresponding to the simple mail transfer protocol email address, and an attachment, the first email message further including displaying characters and non-displaying characters;
search for non-displaying characters in the first email message;
remove the non-displaying characters, including non-displaying comments and non-displaying control characters;
determine non-alphabetic displaying characters in the first email message, where determining the non-alphabetic displaying characters includes a per-character analysis that recursively determines for each character whether:
a character is a non-alphabetic character;
if the character is a non-alphabetic character, whether the character is a space;
if the character is a space, determine whether the space is adjacent to a solitary "i" or "a"; in response to a determination that the space is not adjacent to a solitary "i" or "a", deleting the non-alphabetic character; and
if the non-alphabetic character is not a space, filtering the determined non-alphabetic displaying characters from the first email message;
tokenize the simple mail transfer protocol email address to generate an address token representative of the simple mail transfer protocol email address;
tokenize the attachment to generate an attachment token that is representative of the attachment;
tokenize the domain name to generate a domain token representative of the domain name;

determine a corresponding spam probability value from the address token, the attachment token, and the domain token; and determine whether at least one of the address token, the attachment token, and the domain token is present in a database of tokens and, in response to a determination that at least one of the address token, the attachment token, and the domain token is present in the database of tokens:
  update the corresponding spam probability value of the address token, the attachment token, and the domain token;
  sort the address token, the attachment token, and the domain token in accordance with the corresponding spam probability value to determine a predefined number of interesting tokens, the predefined number of interesting tokens being a subset of the generated tokens, wherein only displaying characters are tokenized; and
  filter a second email message.

16. The non-transitory computer-readable storage medium of claim 15, the program further causing the computer to perform at least the following:
  assign an address spam probability value to the address token representative of the simple mail transfer protocol email address;
  assign a domain spam probability value to the domain token representative of the domain name; and
  generate a Bayesian probability value using the address spam probability value and the domain spam probability value assigned to the tokens.

17. The non-transitory computer-readable storage medium of claim 16, the program further causing the computer to perform at least the following:
  compare the Bayesian probability value with a predefined threshold value.

18. The non-transitory computer-readable storage medium of claim 17, the program further causing the computer to perform at least the following:
  categorize the first email message as spam in response to the Bayesian probability value being greater than the predefined threshold.

19. The non-transitory computer-readable storage medium of claim 17, the program further causing the computer to perform at least the following:
  categorize the first email message as non-spam in response to the Bayesian probability value being not greater than the predefined threshold.

20. A system comprising:
  a memory component that stores at least the following:
    email receive logic configured to receive a first email message comprising an attachment and an address, the email message further including displaying characters and non-displaying characters;
    search logic configured to search for the non-displaying characters in the first email message;
    remove logic configured to remove the non-displaying characters, including non-displaying comments and non-displaying control characters;
    determine logic configured to determine non-alphabetic displaying characters in the first email message, where determining the non-alphabetic displaying characters includes a per-character analysis that recursively determines for each character whether:
      a character is a non-alphabetic character;
      if the character is a non-alphabetic character, whether the character is a space;
      if the character is a space, determine whether the space is adjacent to a solitary "i" or "a";
      in response to a determination that the space is not adjacent to a solitary "i" or "a", deleting the non-alphabetic character; and
      if the non-alphabetic character is not a space, filtering the determined non-alphabetic displaying characters from the first email message;
    tokenize logic configured to generate at least one attachment token representative of the attachment;
    analysis logic configured to determine a corresponding spam probability value from the at least one attachment token; and
    database determining logic configured to determine whether the at least one attachment token is present in a database of tokens and, in response to a determination that the at least one attachment token is present in the database of tokens:
      update the corresponding spam probability value of the at least one attachment token;
      sort the at least one attachment token in accordance with the corresponding spam probability value to determine a predefined number of interesting tokens, the predefined number of interesting tokens being a subset of the at least one attachment token, wherein only displaying characters are tokenized; and
      filter a second email message.

21. A non-transitory computer-readable storage medium that includes a program that, when executed by a computer, performs at least the following:
  receive a first email message comprising an attachment and an address, the first email message further including displaying characters and non-displaying characters;
  search for the non-displaying characters in the first email message;
  remove the non-displaying characters, including non-displaying comments and non-displaying control characters;
  determine non-alphabetic displaying characters in the first email message, where determining the non-alphabetic displaying characters includes a per-character analysis that recursively determines for each character whether:
    a character is a non-alphabetic character;
    if the character is a non-alphabetic character, whether the character is a space;
    if the character is a space, determine whether the space is adjacent to a solitary "i" or "a";
    in response to a determination that the space is not adjacent to a solitary "i" or "a", deleting the non-alphabetic character; and
    if the non-alphabetic character is not a space, filtering the determined non-alphabetic displaying characters from the first email message;
  generate at least one attachment token representative of the attachment;
  determine a spam probability value from the at least one attachment token; and
  determine whether the at least one attachment token is present in a database of tokens and, in response to a determination that the at least one attachment token is present in the database of tokens:
  update the spam probability value of the at least one attachment token;
  sort the at least one attachment token in accordance with the spam probability value to determine a predefined number of interesting tokens, the predefined number of interesting tokens being a subset of the generated tokens, wherein only displaying characters are tokenized; and filter a second email message.

22. The non-transitory computer-readable storage medium of claim 21, the program further causing the computer to perform at least the following:
receive the first email message having a text body.

23. The non-transitory computer-readable storage medium of claim 22, the program further causing the computer to perform at least the following:
tokenize words in the text body to generate body tokens representative of the words in the text body.

24. The non-transitory computer-readable storage medium of claim 23,
assign a body spam probability value to each of the body tokens representative of the words in the text body;
assign an attachment spam probability value to the token representative of the attachment; and
generate a Bayesian probability value using the attachment spam probability and the body spam probability assigned to the body tokens and the attachment token.

25. The non-transitory computer-readable storage medium of claim 24, the program further causing the computer to perform at least the following:
compare the Bayesian probability value with a predefined threshold value.

26. The non-transitory computer-readable storage medium of claim 25, the program further causing the computer to perform at least the following:
categorize the first email message as spam in response to the Bayesian probability value being greater than the predefined threshold.

27. The non-transitory computer-readable storage medium of claim 25, the program further causing the computer to perform at least the following:
categorize the first email message as non-spam in response to the Bayesian probability value being not greater than the predefined threshold.

* * * * *